(12) United States Patent
Watson et al.

(10) Patent No.: US 11,800,002 B2
(45) Date of Patent: Oct. 24, 2023

(54) AUDIO DATA ROUTING BETWEEN MULTIPLE WIRELESSLY CONNECTED DEVICES

(71) Applicant: Apple Inc., Cupertino, CA (US)

(72) Inventors: Robert D. Watson, Menlo Park, CA (US); Ganesha Adkasthala Ganapathi Batta, San Jose, CA (US); Anthony Guetta, San Carlos, CA (US); David John Shaw, San Diego, CA (US); Craig Dooley, Los Gatos, CA (US); Chris Saari, San Francisco, CA (US); Gregory Novick, San Francisco, CA (US); Nathan De Vries, San Francisco, CA (US); Sriram Hariharan, San Jose, CA (US); Patrick Ian Bernhard, San Jose, CA (US); Dana McLaughlin, Waikoloa, HI (US); Jeffrey Chandler Moore, Belmont, CA (US); Patrick Lee Coffman, San Francisco, CA (US); Jonathan Anderson Bennett, San Francisco, CA (US); Deepak Iyer, Sunnyvale, CA (US); Albert Riley Howard, Jr., Cupertino, CA (US); Jason Conn, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 542 days.

(21) Appl. No.: 16/778,473

(22) Filed: Jan. 31, 2020

(65) Prior Publication Data

US 2020/0244789 A1 Jul. 30, 2020

Related U.S. Application Data

(63) Continuation of application No. 15/920,172, filed on Mar. 13, 2018, now Pat. No. 10,554,800, which is a
(Continued)

(51) Int. Cl.
*H04M 1/60* (2006.01)
*H04R 3/12* (2006.01)
(Continued)

(52) U.S. Cl.
CPC ............ *H04M 1/6066* (2013.01); *H04R 3/12* (2013.01); *H04W 4/80* (2018.02); *H04W 68/005* (2013.01);
(Continued)

(58) Field of Classification Search
CPC ...................................................... H04W 4/80
See application file for complete search history.

(56) References Cited

U.S. PATENT DOCUMENTS 6,745,043 B1 6/2004 Lester et al.
7,558,635 B1 7/2009 Thiel et al.
(Continued)

FOREIGN PATENT DOCUMENTS

CN 201585110 U 9/2010
CN 102057692 A 5/2011
(Continued)

OTHER PUBLICATIONS

European Patent Application No. 20157127.0—Partial European Search Report dated Apr. 23, 2020.
(Continued)

*Primary Examiner* — Wen W Huang
(74) *Attorney, Agent, or Firm* — DICKINSON WRIGHT RLLP

(57) ABSTRACT

Apparatus and methods to communicate audio data from either an active wireless device or a requesting wireless device to one or more audio reproduction devices that are simultaneously communicatively coupled to both the active wireless device and to the requesting wireless device are disclosed. Responsive to a request from the requesting
(Continued)

| Active Wireless Device | Requesting Wireless Device | | | | | | | |
|---|---|---|---|---|---|---|---|---|
| | Alert | Navigation | Music | Video | Voice Mail | Alarm | Ringtone | Voice/Video Call |
| No Audio | Yes | Yes | Yes | Yes | Yes | Yes | N/A | Yes |
| Alert | No | No | Yes | Yes | Yes | Yes | N/A | Yes |
| Navigation | No | No | Yes | Yes | Yes | Yes | N/A | Yes |
| Game Audio | No | No | Yes | Yes | Yes | Yes | N/A | Yes |
| Music | No | No | Yes | Yes | Yes | Yes | N/A | Yes |
| Video | No | No | Yes | Yes | Yes | Yes | N/A | Yes |
| Voice Recorder | No | No | Yes | Yes | Yes | Yes | N/A | Yes |
| Voice Mail | No | No | Yes | Yes | Yes | Yes | N/A | Yes |
| Personal Assistant | No | No | Yes | Yes | Yes | Yes | N/A | Yes |
| Alarm | No | No | Yes | Yes | Yes | Yes | N/A | Yes |
| Ringtone | No | No | No | No | No | No | No | N/A |
| Voice/Video Call | No | No | No | No | No | No | N/A | N/A | wireless device to transmit audio data to the one or more audio reproduction devices, the active wireless device determines whether to transmit audio data from the requesting wireless device based at least in part on an audio status of the active wireless device and a set of predetermined arbitration criteria that prioritizes among applications and operating system processes that generate the audio data.

20 Claims, 8 Drawing Sheets

Related U.S. Application Data continuation of application No. 15/169,554, filed on May 31, 2016, now Pat. No. 9,924,010.

(60) Provisional application No. 62/171,558, filed on Jun. 5, 2015.

(51) Int. Cl.
| | |
|---|---|
| H04W 76/36 | (2018.01) |
| H04W 4/80 | (2018.01) |
| H04W 72/566 | (2023.01) |
| H04W 68/00 | (2009.01) |
| H04R 1/10 | (2006.01) |
| H04R 5/033 | (2006.01) |
| H04R 5/04 | (2006.01) |
| H04W 76/15 | (2018.01) |

(52) U.S. Cl.
CPC ......... *H04W 72/566* (2023.01); *H04W 76/36* (2018.02); *H04R 1/1041* (2013.01); *H04R 5/033* (2013.01); *H04R 5/04* (2013.01); *H04R 2420/01* (2013.01); *H04R 2420/07* (2013.01); *H04W 76/15* (2018.02)

(56) References Cited

U.S. PATENT DOCUMENTS

| | | | |
|---|---|---|---|
| 8,019,272 | B2 | 9/2011 | Masuda |
| 8,295,766 | B2 | 10/2012 | Zimbric et al. |
| 8,639,214 | B1 | 1/2014 | Fujisaki |
| 9,648,409 | B2 | 5/2017 | Puskarich |
| 9,763,276 | B2 | 9/2017 | Seymour et al. |
| 9,924,010 | B2 | 3/2018 | Watson et al. |
| 2002/0068610 | A1 | 6/2002 | Anvekar et al. |
| 2002/0072816 | A1 | 6/2002 | Shdema et al. |
| 2002/0098878 | A1 | 7/2002 | Mooney et al. |
| 2002/0193910 | A1 | 12/2002 | Strege et al. |
| 2003/0133582 | A1 | 7/2003 | Niederdrank |
| 2003/0223604 | A1* | 12/2003 | Nakagawa .......... H04M 1/6066 381/311 |
| 2004/0198464 | A1 | 10/2004 | Panian |
| 2005/0027385 | A1 | 2/2005 | Yueh |
| 2005/0097593 | A1 | 5/2005 | Raley et al. |
| 2006/0046656 | A1 | 3/2006 | Yang |
| 2006/0068760 | A1 | 3/2006 | Hameed et al. |
| 2006/0094461 | A1 | 5/2006 | Hameed et al. |
| 2006/0116107 | A1 | 6/2006 | Hulvey |
| 2006/0210092 | A1* | 9/2006 | Navid .................. H04R 1/10 381/384 |
| 2007/0121959 | A1 | 5/2007 | Philipp |
| 2007/0140187 | A1 | 6/2007 | Rokusek et al. |
| 2007/0206829 | A1* | 9/2007 | Weinans ............. H04M 1/6066 381/370 |
| 2007/0213092 | A1 | 9/2007 | Geelen |
| 2007/0255435 | A1* | 11/2007 | Cohen ................. H04R 25/505 700/94 |
| 2008/0032663 | A1* | 2/2008 | Doyle ..................... H04R 5/04 455/345 |
| 2008/0070516 | A1 | 3/2008 | Lee et al. |
| 2008/0186960 | A1* | 8/2008 | Kocheisen .............. G06F 3/165 370/359 |
| 2009/0061841 | A1 | 3/2009 | Chaudhri et al. |
| 2009/0187967 | A1 | 7/2009 | Rostaing et al. |
| 2009/0197532 | A1* | 8/2009 | Wyper .............. H04W 52/0261 455/569.1 |
| 2009/0238386 | A1* | 9/2009 | Usher ..................... G10L 13/00 704/260 |
| 2009/0304214 | A1 | 12/2009 | Xiang et al. |
| 2010/0128887 | A1 | 5/2010 | Lee et al. |
| 2010/0158288 | A1* | 6/2010 | Winter ..................... H04R 5/04 381/311 |
| 2010/0208922 | A1 | 8/2010 | Erni et al. |
| 2011/0054907 | A1* | 3/2011 | Chipchase .......... H04M 1/6066 704/E15.04 |
| 2011/0151788 | A1 | 6/2011 | Castrogiovanni et al. |
| 2011/0217967 | A1 | 9/2011 | Cohen et al. |
| 2011/0250920 | A1* | 10/2011 | Shimizu ............ H04W 72/1215 455/512 |
| 2011/0301728 | A1* | 12/2011 | Hamilton ............. G11B 27/034 700/94 |
| 2012/0030465 | A1 | 2/2012 | Bailey |
| 2012/0058727 | A1 | 3/2012 | Cook et al. |
| 2012/0171958 | A1 | 7/2012 | Cornett et al. |
| 2013/0066636 | A1 | 3/2013 | Singhal |
| 2013/0114823 | A1 | 5/2013 | Kari et al. |
| 2013/0311692 | A1 | 11/2013 | Huang et al. |
| 2013/0316642 | A1* | 11/2013 | Newham ........... H04W 52/0206 455/67.11 |
| 2014/0016803 | A1 | 1/2014 | Puskarich |
| 2014/0065962 | A1 | 3/2014 | Le et al. |
| 2014/0071288 | A1* | 3/2014 | Kim ................... H04N 5/23206 348/158 |
| 2014/0376737 | A1 | 12/2014 | Goldman |
| 2015/0207687 | A1 | 7/2015 | Richman |
| 2015/0264516 | A1* | 9/2015 | Ota ....................... H04W 76/14 455/41.1 |
| 2015/0341482 | A1 | 11/2015 | Lee et al. |
| 2015/0351143 | A1* | 12/2015 | Seymour .............. H04R 25/554 455/41.2 |
| 2015/0382098 | A1 | 12/2015 | Aita |
| 2016/0029114 | A1 | 1/2016 | Chen |
| 2016/0071409 | A1* | 3/2016 | Suomela .............. H04R 1/1041 340/12.5 |
| 2016/0156636 | A1 | 6/2016 | Tan et al. |
| 2016/0269532 | A1 | 9/2016 | Fukuda et al. |
| 2016/0353194 | A1 | 12/2016 | Stevens |
| 2016/0360018 | A1 | 12/2016 | Watson et al. |
| 2018/0205813 | A1 | 7/2018 | Watson et al. |

FOREIGN PATENT DOCUMENTS

| | | |
|---|---|---|
| CN | 103167370 A | 6/2013 |
| CN | 203289452 U | 11/2013 |

OTHER PUBLICATIONS

Chinese Application for Invention No. 201911401110.8—Second Office Action dated Jan. 6, 2022.
Chinese Application for Invention No. 201911401110.8—Notice of Allowance dated Mar. 23, 2022.
Chinese Application for Invention No. 201911401110.8—First Office Action dated May 25, 2021.
European Patent Application No. 20157127.0—Extended European Search Report dated Aug. 21, 2020.
European Patent Application No. 16172660.9—European Search Report dated Oct. 25, 2016.
Korean Patent Application No. 16172660.9—Notice of Preliminary Rejection dated Dec. 27, 2016.
European Patent Application 16172660.9—Summons of Oral Proceedings dated Feb. 14, 2019.
Chinese Patent Application No. 201610537126.1—Second Office Action dated May 5, 2019.

(56) References Cited

OTHER PUBLICATIONS

European Patent Application No. 20157127.0—Commucation purusuant to Article 94(3) EPC dated May 30, 2022.

* cited by examiner

300

| Active Wireless Device | Requesting Wireless Device | | | | | | | |
|---|---|---|---|---|---|---|---|---|
| | Alert | Navigation | Music | Video | Voice Mail | Alarm | Ringtone | Voice/ Video Call |
| No Audio | Yes | Yes | Yes | Yes | Yes | Yes | N/A | Yes |
| Alert | No | No | Yes | Yes | Yes | Yes | N/A | Yes |
| Navigation | No | No | Yes | Yes | Yes | Yes | N/A | Yes |
| Game Audio | No | No | Yes | Yes | Yes | Yes | N/A | Yes |
| Music | No | No | Yes | Yes | Yes | Yes | N/A | Yes |
| Video | No | No | Yes | Yes | Yes | Yes | N/A | Yes |
| Voice Recorder | No | No | Yes | Yes | Yes | Yes | N/A | Yes |
| Voice Mail | No | No | Yes | Yes | Yes | Yes | N/A | Yes |
| Personal Assistant | No | No | Yes | Yes | Yes | Yes | N/A | Yes |
| Alarm | No | No | Yes | Yes | Yes | Yes | N/A | Yes |
| Ringtone | No | No | No | No | No | No | No | N/A |
| Voice/Video Call | No | No | No | No | No | No | N/A | N/A |

*FIG. 3A*

|  |  | Requesting Wireless Device | | | | |
|---|---|---|---|---|---|---|
| | Audio Data Priority | None (e.g., VoiceOver, Non-BT Audio) | Low (e.g., Notif. Alert, Nav. Direction, Game) | Medium (e.g., Music, Video, Voicemail, Alarm) | High (Ringtone) | Critical (e.g., Voice Call, Video Call) |
| Active Wireless Device | No Audio (e.g., Pause, Mute) | No | Yes | Yes | Yes | Yes |
| | None (e.g., VoiceOver, Non-BT Audio) | No | Yes | Yes | Yes | Yes |
| | Low (e.g., Notif. Alert, Nav. Direction, Game) | No | Yes | Yes | Yes | Yes |
| | Medium (e.g., Music, Video, Voicemail, Alarm) | No | No | Yes | Yes | Yes |
| | High (Ringtone) | No | No | No | Yes | Yes |
| | Critical (e.g., Voice Call, Video Call) | No | No | No | No | Yes |

AUDIO DATA ROUTING BETWEEN MULTIPLE WIRELESSLY CONNECTED DEVICES

CROSS-REFERENCE TO RELATED APPLICATIONS

The present application is a continuation of U.S. application Ser. No. 15/920,172, filed Mar. 13, 2018, entitled "AUDIO DATA ROUTING BETWEEN MULTIPLE WIRELESSLY CONNECTED DEVICES," set to issue as U.S. Pat. No. 10,554,800 on Feb. 4, 2020, which is a continuation of U.S. application Ser. No. 15/169,554, filed May 31, 2016, entitled "AUDIO DATA ROUTING BETWEEN MULTIPLE WIRELESSLY CONNECTED DEVICES," issued as 9,924,010 on Mar. 20, 2018, which claims the benefit of U.S. Provisional Application No. 62/171,558 filed Jun. 5, 2015, entitled "AUDIO ROUTING BETWEEN MULTIPLE WIRELESSLY CONNECTED DEVICES," the contents of which are incorporated herein by reference in their entirety for all purposes.

FIELD

The present technology pertains to routing of data, including audio data, between multiple wirelessly connected devices.

BACKGROUND

Conventional technology allows one or more audio reproduction devices to be connected simultaneously to multiple wireless client devices. This conventional technology can result in an inferior user experience when each of the multiple wireless client devices attempts to send audio data to the one or more audio reproduction devices at or near the same time, resulting in conflicts, confusion, and sudden abrupt changes in output from the one or more audio reproduction devices. Thus, there exists a need to route audio data intelligently from multiple wirelessly connected devices to one or more audio reproduction devices. There also exists a need to improve communication between the one or more audio reproduction devices.

SUMMARY

Features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Systems, methods, and non-transitory computer-readable storage media for providing an improved user experience by intelligently routing audio data from multiple wirelessly connected devices to one or more audio reproduction devices are disclosed. An example method includes detecting a current audio status of an active wireless device. The example method further includes determining whether to pass audio data from a requesting wireless device, either directly or via the active wireless device, to either one or both of a pair of wirelessly connected audio reproduction devices based at least in part on the current audio status of the active wireless device and predetermined arbitration criteria. The method can also include passing the audio data from the requesting wireless device to either one or both of the pair of wirelessly connected audio reproduction devices when the current audio status of the active wireless device and the audio data from the requesting wireless device meet the predetermined arbitration criteria. Other advantages are provided that allow maintaining communication between wirelessly connected audio reproduction devices and one or both of the active wireless device and the requesting wireless device.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings.

FIG. 3A illustrates an example set of predetermined arbitration criteria for determining whether to pass audio data from a requesting wireless device to either or both of a pair of wireless audio reproduction devices.

FIG. 3B illustrates another example set of predetermined arbitration criteria for determining whether to pass audio data from a requesting wireless device to either or both of a pair of wireless audio reproduction devices.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for routing audio data from multiple wirelessly connected devices to one or more wireless audio reproduction devices.

The disclosed technology also addresses the need for improved communication between the one or more wireless audio reproduction devices.

Figure 1:
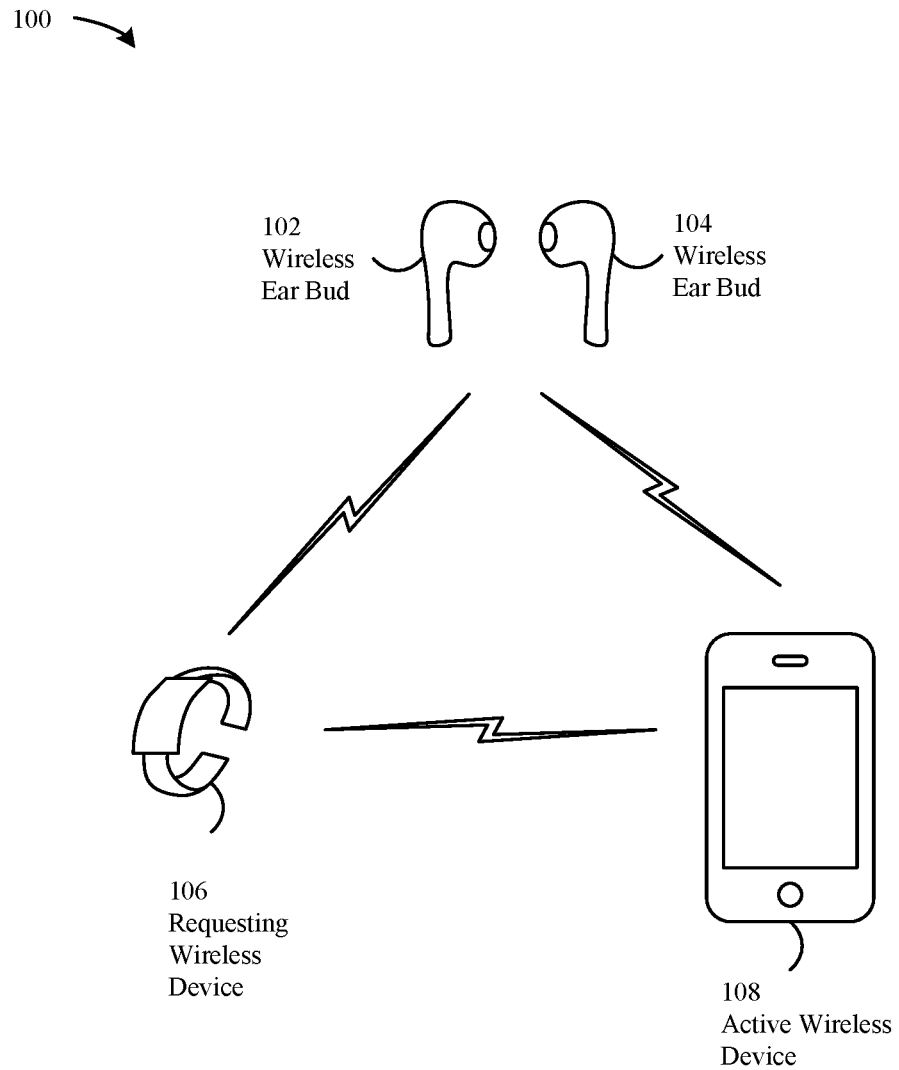
FIG. 1 illustrates an example system including a pair of wireless audio reproduction devices connected to an active wireless device and to a requesting wireless device.

FIG. 1 illustrates an example system 100 including a representative pair of wireless audio reproduction devices, e.g., a pair of wireless ear buds 102, 104, connected to an active wireless device 108 and also connected to a requesting wireless device 106. A user can wear either a single one of the wireless ear buds, e.g., ear bud 102 or ear bud 104, or the user can wear both wireless ear buds 102, 104 to receive audio data and to reproduce audio based at least in part on the received audio data via one or both of the wireless ear buds 102, 104. In one example, the audio data can be monophonic; in which case, wireless ear bud 102 and wireless ear bud 104 each receive the same audio data. In another example, the audio data can be stereophonic, such that wireless ear bud 102 and wireless ear bud 104 each receive different audio data corresponding to a left channel and a right channel. In other embodiments, where only a single wireless ear bud is used, monophonic audio data, at least one channel of stereophonic audio data, or both channels of stereophonic audio data can be sent to the single wireless ear bud in use. When both channels of stereophonic audio data are sent, the single wireless ear bud can mix the stereophonic audio data to present a monophonic audio reproduction of the stereophonic audio data.

The pair of wireless ear buds (e.g., wireless ear bud 102 and wireless ear bud 104) can be simultaneously connected to the active wireless device 108 and to the requesting wireless device 106. The active wireless device 108 can have an active data connection, i.e., a data connection that is active, (e.g., sending audio data), and that has a higher priority than data connections of other wireless devices with respect to communication with one or more of the pair of wireless ear buds 102, 104. The requesting wireless device 106 can also be connected to one or more of the pair of wireless ear buds 102, 104, and the data connection of the requesting wireless device 106 can have a lower priority than the data connection of the active wireless device 108 with respect to one or more of the pair of wireless ear buds 102, 104. The active wireless device 108 with the higher priority data connection can be referred to as a primary device, while the requesting wireless device 106 having the lower priority data connection can be referred to as a secondary device.

The requesting wireless device 106 can request to establish a higher priority for communication via its data connection with one or more of the pair of wireless ear buds 102, 104 such that the active wireless device 108 suspends communication over its corresponding data connection with one or more of the pair of wireless ear buds 102, 104. In the example shown in FIG. 1, the active wireless device 108 can be referred to as a host device, and the requesting wireless device 106 can be referred to as a wearable device.

As shown in FIG. 1, in some embodiments, the active wireless device 108 can be, e.g., a smartphone device and the requesting wireless device 106 can be, e.g., a smart watch device. One of ordinary skill in the art will recognize that any wireless device can serve as either an active wireless device or as a requesting wireless device, including a desktop, notebook, laptop, tablet computer, smart phone, smart watch, hybrid device, wearable device such as glasses, etc. Also, the pair of wireless ear buds (i.e., wireless ear bud 102 and wireless ear bud 104), the active wireless device 108, and the requesting wireless device 106 can each communicate with each other via any available wireless communication protocol, including proprietary wireless communication protocols and standards-based wireless communication protocols such as Bluetooth®, Wi-Fi, etc. Communication between the pair of wireless ear buds 102, 104, the active wireless device 108, and the requesting wireless device 106 can provide for a closed loop status control between the three wireless devices, thus avoiding delays and maintaining coordinated behavior. Also, the active wireless device 108 and the requesting wireless device 106 can manage audio data communication to the pair of wireless ear buds 102, 104.

In one aspect of the disclosed technology, either one or both of the active wireless device 108 and the requesting wireless device 106 can be established as a priority connection, indicating a device to which the pair of wireless ear buds 102, 104 will attempt to connect if any links or connections are lost.

In one aspect of the disclosed technology, if a link between the active wireless device 108 and the requesting wireless device 106 drops, either one or both of the pair of wireless ear buds 102, 104 can serve as a communication conduit between the active wireless device 108 and the requesting wireless device 106. For example, if a communication link, such as a Bluetooth link, between the active wireless device 108 and the requesting wireless device 106 fails, communication between the active wireless device 108 and the requesting wireless device 106 can be routed through the wireless ear bud 102 and/or the wireless ear bud 104. Either or both of the pair of wireless ear buds 102, 104 can serve as a bridge or conduit between the active wireless device 108 and the requesting wireless device 106, e.g., until a direct communication path is re-established between the active wireless device 108 and the requesting wireless device 106. Various predetermined rules can govern the behavior of incoming calls, outgoing calls, media playback, use of a conduit mode, etc. for the reproduction of audio via the wireless ear buds 102, 104 connected to the active wireless device 108 and the requesting wireless device 106.

In another aspect of the disclosed technology, one of the wireless ear buds in the pair of wireless ear buds 102, 104, such as wireless ear bud 102, can be established as a primary wireless ear bud and can communicate with the active wireless device 108 and/or with the requesting wireless device 106 to determine operating parameters for communication, such as one or more radio frequency channels, a radio frequency hopping schedule, link management parameters, messaging parameters, etc. The non-primary wireless ear (such as wireless ear bud 104) can obtain the operating parameters from the primary wireless ear bud 102 and/or by sniffing/monitoring communication between the primary wireless ear bud 102 and the active wireless device 108 or communication between the primary wireless ear bud 102 and the requesting wireless device 106. In some aspects, the role of which wireless ear bud serves as the primary wireless ear bud can switch, e.g., manually or automatically, from one wireless ear bud to another wireless ear bud, e.g., based at least in part on one or more factors: (i) detection of a change in wearing status, such as between an out-of-ear wearing status (out-of-ear status) and an in-ear wearing status (in-ear status), (ii) battery levels, or (iii) a manual configuration of primary/secondary roles for the wireless ear buds 102, 104. In other aspects, automatically switching the role of which wireless ear bud serves as the primary wireless ear bud can be disabled for accessibility concerns (e.g., if a user has diminished hearing in one ear). In yet another aspect, wireless ear bud 102 and wireless ear bud 104 can establish and use an independent link or communication channel with each other, e.g., to communicate performance and configuration data between them.

In another aspect of the disclosed technology, the active wireless device 108 can facilitate establishing a connection between the requesting wireless device 106 and either or both of the wireless ear buds 102, 104. For example, the active wireless device 108 can generate parameters and/or keys necessary for a secondary wireless device, such as the requesting wireless device 106, to establish a connection with either or both of the wireless ear buds 102, 104. The active wireless device 108 can send parameters/keys to the requesting wireless device 106 to permit the requesting wireless device 106 to establish a connection with either one or both of the wireless ear buds 102, 104. In some embodiments, the connection can be established autonomously, e.g., without intervention from a user of the active wireless device 108. In an exemplary embodiment, for a Bluetooth connection, the requesting wireless device 106 can use keys received from the active wireless device 108 to automatically pair with either one or both of the wireless ear buds 102, 104.

Although a pair of wireless ear buds is shown in FIG. 1, any number of wired or wirelessly connected audio reproduction devices can utilize the disclosed technology, including any type of wired or wireless audio headset.

Figure 2:
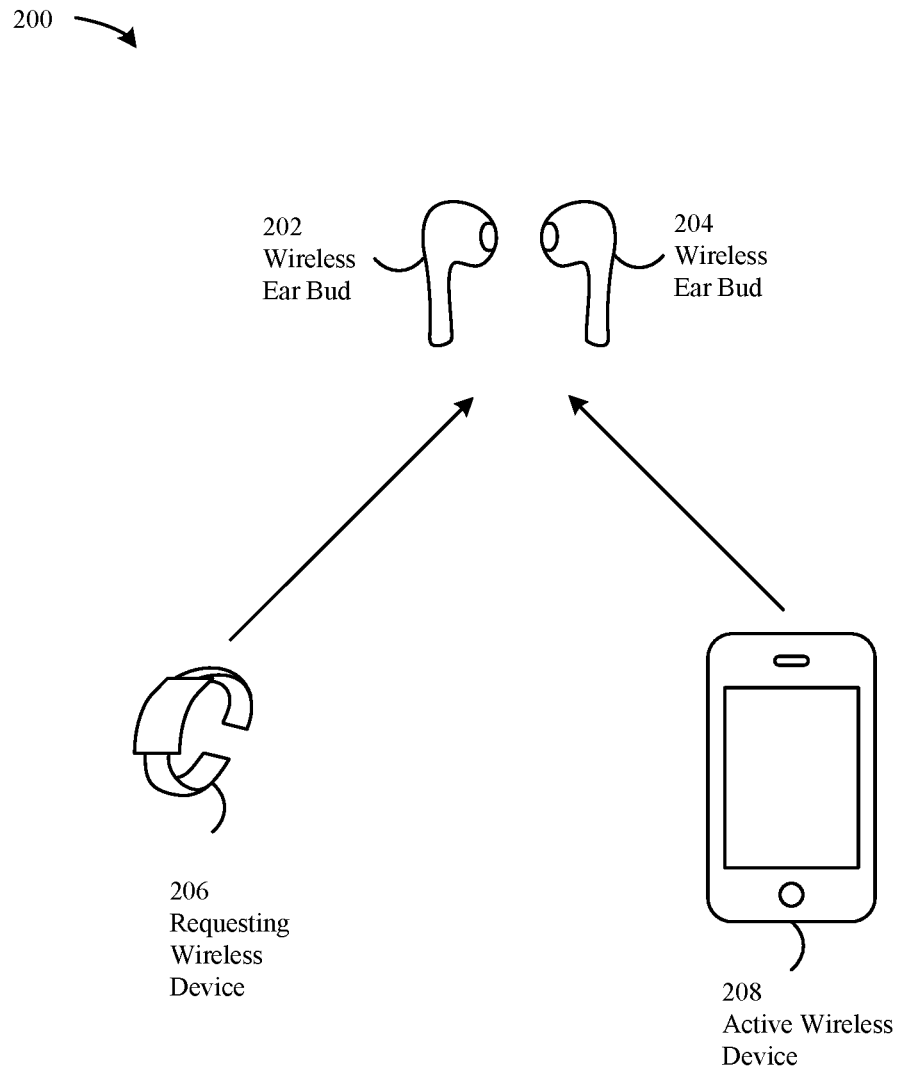
FIG. 2 illustrates an example system in which an active wireless device and a requesting wireless device both send audio data to either or both of a pair of wireless audio reproduction devices.

FIG. 2 illustrates an example system 200 in which an active wireless device 208 and a requesting wireless device 206 both send audio data to either or both of a pair of wireless audio reproduction devices 202, 204. More specifically, FIG. 2 illustrates the active wireless device 208 and the requesting wireless device 206 sending data, including audio data, to either or both of a pair of wireless ear buds 202, 204, the pair of wireless ear buds including wireless ear bud 202 and wireless ear bud 204. Either or both of the pair of wireless ear buds 202, 204 can determine when to authorize an interrupt request from the requesting wireless device 206 based at least in part on a status of the active wireless device 208 and on predetermined arbitration rules. In one example, either or both of the pair of wireless ear buds 202, 204 will authorize an interrupt request from the requesting wireless device 206 when the status of the active wireless device 208 meets the predetermined arbitration rules, and will pass through audio data to the wireless ear buds 202, 204 so that a user can hear audio reproduction of the audio data. In a more specific example, either or both of the pair of wireless ear buds 202, 204 can authorize a voicemail interrupt request from the requesting wireless device 206 when the active wireless device 208 is in a music playing status, and the active wireless device 208 can pause music playing on the active wireless device 208 to allow audio data for the voicemail to pass through to the pair of wireless ear buds 202, 204, thereby permitting a user to listen to audio reproduction of the voicemail audio data. Subsequently, the active wireless device 208 can un-pause the music playing on the active wireless device 208, after completion of transfer of the voicemail audio data.

In another example, either one or both of the pair of wireless ear buds 202, 204 can be configured to not authorize an interrupt request from the requesting wireless device 206 when the status of the active wireless device 208 does not meet the predetermined arbitration rules, and will not allow audio data to pass through to the pair of wireless ear buds, and a user continues to hear audio from the active wireless device 208. In a more specific example, either or both of the pair of wireless ear buds 202, 204 can determine to not authorize interrupt requests from the requesting wireless device 206 when the active wireless device 208 is in a voice call status or a video chat status.

In another embodiment, the requesting wireless device 206 can communicate with the active wireless device 208 to coordinate data transmission to the wireless ear bud 202 and/or the wireless ear bud 204. For example, the requesting wireless device 206 can communicate with the active wireless device 208 (e.g. using a message, signal, interrupt, or the like) and indicate to the active wireless device 208 that the requesting wireless device 206 would like to send data to the wireless ear bud 202 and/or to the wireless ear bud 204. The communication from the requesting wireless device 206 can identify the type of data that the requesting wireless device 206 would like to send. For example, the communication can indicate that the requesting wireless device 206 would like to send audio corresponding to an alarm or a voicemail to the wireless ear bud 202 and/or to the wireless ear bud 204. The active wireless device 208 can determine its current status with respect to the wireless ear bud 202 and/or the wireless ear bud 204. For example, the active wireless device 208 can determine that it is currently sending audio data to the wireless ear bud 202 and/or to the wireless ear bud 204, the audio data corresponding to a voice call, music, video, etc. Based at least in part on the current status of the active wireless device 208 and on a set of predetermined arbitration rules, the active wireless device 208 can determine that the active wireless device 208 should maintain its higher priority and deny the request from the requesting wireless device 206. Alternatively, based at least in part on the current status of the active wireless device 208 and on a set of predetermined arbitration rules, the active wireless device 208 can determine that the request from the requesting wireless device 206 should take priority over communication (if any) from the active wireless device 208, and the active wireless device 208 can stop sending audio data to the wireless ear bud 202 and/or the wireless ear bud 204 to permit the requesting wireless device 206 to send audio data to the wireless ear bud 202 and/or the wireless ear bud 204.

FIG. 3A illustrates a table 300 of example predetermined arbitration criteria for determining whether to pass audio data from a requesting wireless device 206 to either one or both of a pair of audio reproduction devices, e.g., a pair of wireless ear buds 202, 204, associated with an active wireless device 208. The table 300 of FIG. 3 includes a list of sources for audio data for the active wireless device 208 and for the requesting wireless device 206. The sources for audio data listed in table 300 can also be referred to as an audio status or state for the applicable wireless device. For example, the "Alert" source for the active wireless device 208 can indicate an audio status or state for the active wireless device 208 in which audio data for an alert is being communicated to one or both of the pair of audio reproduction devices, e.g., the pair of wireless ear buds 202, 204. As another example, the "No Audio" source for the active wireless device 208 can indicate an audio status or state for the active wireless device 208 in which no audio data is being communicated to one or both of the pair of audio reproduction devices, e.g., the pair of wireless ear buds 202, 204. As illustrated by table 300, certain types of audio for which the requesting wireless device 206 would like to interrupt the active wireless device 208 to communicate audio data to the pair of wireless ear buds 202, 204 can take priority and be passed through to the pair of wireless ear buds 202, 204 in place of audio data from the active wireless device 208. Whether to interrupt audio data from the active wireless device 208 depends on the type of audio data being sent (if any) by the active wireless device 208 and the type of audio data from the requesting wireless device 206. When the active wireless device 208 is sending no audio data, any audio data from the requesting wireless device 206 can be communicated to the pair of wireless ear buds 202, 204. When the active wireless device 208 is sending audio data for any of the types shown in rows 304, audio data of types shown in columns 310 from the requesting wireless device 206 can interrupt communication of audio data from the active wireless device 208, while audio data of types shown in columns 308 from the requesting wireless device 206 cannot interrupt communication of audio data from the active wireless device 208. Additionally audio data for a voice/video call (included in columns 312) from the requesting wireless device 206 can interrupt audio data communication of the active wireless device 208 for any of the types shown in rows 304, while a ringtone (also included in columns 312) can be an audio type that is not applicable to the requesting wireless device 206. When the active wireless device 208 is sending audio data for any of the types shown in rows 306, no audio data type from the requesting wireless device 206 can interrupt communication of audio data from the active wireless device 208.

For the row 302 of the table 300, the active wireless device 208 can be in a state in which no audio data is being sent to the pair of wireless ear buds 202, 204, e.g., music is paused and/or a mute function is enabled on the active wireless device 208, and while the active wireless device 208 is in this state, audio data from any source of the requesting wireless device 206 can be passed to either one or both of the pair of wireless ear buds 202, 204 to which the active wireless device 208 and the requesting wireless device 206 are wirelessly connected. Representative sources for audio data from the requesting wireless device 206 include: alert, navigation, music video, voice mail, alarm, voice call, video call, etc. listed in columns 308, 310, and 312 of table 300.

For the rows 304 of the table 300, the active wireless device 208 is sending audio data corresponding to one of the following sources: alert, navigation, game audio, music, video, voice recorder, voicemail, personal assistant, or alarm to one or both of the pair of wireless ear buds 202, 204. Depending on the type of source for audio data from the requesting wireless device 206, the audio data from the active wireless device 208 can be interrupted, e.g., paused or muted, to allow the audio data from the requesting wireless device 206 to take priority for communication to one or both of the pair of wireless ear buds 202, 204. As shown in the table 300, audio data from the requesting wireless device 206 corresponding to an alert type source or to a navigation type source listed in columns 308 can be declined, e.g., not take priority, over audio data from the active wireless device 208 of types listed in rows 304 or 306. As also shown in the table 300, any audio data from the requesting wireless device 206 that corresponds to a music, video, voicemail, alarm, voice call, or video call type source, as listed in columns 310, can be accepted, e.g., take priority, over audio data from the active wireless device 208 of types listed in rows 304.

For the rows 306 of the table 300, the active wireless device 208 is sending audio data corresponding to one of the following sources: ringtone, voice call, or video call to one or both of the pair of wireless ear buds 202, 204. For any of these sources listed in rows 306, the audio data from the active wireless device 208 can take priority over any type of audio data from the requesting wireless device 206. As indicated in the rows of 306, the predetermined arbitration criteria can determine that no audio data is to be passed from the requesting wireless device 206 to either or both of the pair wireless ear buds 202, 204 when audio data of the types listed in rows 306 are being communicated by the requesting wireless device 206. Those of skill in the art should recognize that other arbitration rules for determining whether to pass audio data from the requesting wireless device 206 (and potentially interrupt transfer of audio data from the active wireless device 208) to either or both of the pair of wireless ear buds 202, 204 based at least in part on sources of audio data, and/or based at least in part on other status criteria of the active wireless device 208 are possible.

FIG. 3B illustrates a table 350 of another set of predetermined arbitration criteria to use to determine whether to allow audio data from a requesting wireless device 206 to be communicated to one or both of a pair of wireless ear buds 202, 204 (or equivalent audio reproduction devices). Different types of audio data, which can originate from different applications or operating system processes at the requesting wireless device 206 or at an active wireless device 208, can be assigned different levels of priority. Exemplary priority levels as shown in FIG. 3B can include "None" (a lowest priority level), and in increasing level of priority, "Low", "Medium", "High", and "Critical" (a highest priority level). Representative sources for audio data for the different priority levels are listed in table 350. For the "None" lowest priority level, audio data of the requesting wireless device that is not Bluetooth audio (or more generally is not routable to the pair of wireless ear buds 202, 204) or is a voice-over are representative examples. Additional representative examples for the "None" lowest priority level can include user interface sound effects, such as key clicks. For the "Low" priority level, audio data from a notification alert, a navigation direction, or a game application are representative examples. For the "Medium" priority level, audio data from a music playback application, a video playback application, a voicemail playback, or a device alarm are representative examples. For the "High" priority level, a ringtone is a representative example. Another representative "High" priority level audio data source is an emergency alert message. For the "Critical" highest priority level, audio data for a voice call (such as a cellular connection, a Voice over Internet Protocol connection, or a FaceTime Audio connection) or for a video call (such as FaceTime video connection) are representative examples.

Arbitration rules can account for the priority levels of audio data from different devices to determine which audio data takes priority for communication to the pair of wireless ear buds 202, 204. In some embodiments, audio data that originates from the requesting wireless device 206 and that has an equal priority or a higher priority to audio data (if any) that originates from the active wireless device 208 can take priority, e.g., interrupt communication of audio data from the active wireless device 208 and allow communication of audio data from the requesting wireless device 206 to one or both of the pair of wireless ear buds 202, 204. In some embodiments, any audio data from a requesting wireless device 206 that has a higher priority than a lowest priority level, e.g., at a "Low" or higher priority level, can be communicated to the pair of wireless ear buds 202, 204 when no audio data is being communicated by the active wireless device 208 to the pair of wireless ear buds 202, 204.

In some embodiments, interruption of audio data communicated from the active wireless device 208 to the pair of wireless ear buds 202, 204 is automatically resumed after completion of communication of the audio data from the requesting wireless device 206. Thus, for example, music playback based at least in part on audio data originating from the active wireless device 208 can be paused or muted to allow communication of audio data from the requesting wireless device 206, when the audio data from the requesting wireless device 206 has an equal or higher priority to the music playback audio data (e.g., "Medium" priority level). After communication of the audio data from the requesting wireless device 206 completes, music playback by the active wireless device 208 can continue, e.g., by un-pausing or un-muting the audio data from the active wireless device 208.

In some embodiments, a set of arbitration rules can be applied in a hierarchical order to determine which of two wireless devices, an active wireless device 208 and a requesting wireless device 206, has priority for communicating audio data to a pair of audio reproduction devices, e.g., the pair of wireless ear buds 202, 204. As a representative example, the active wireless device 208 can be considered a primary device that has a default priority for communication with the pair of wireless ear buds 202, 204 over the requesting wireless device 206, which can be considered a secondary device. Communication for the requesting wireless device 206 can take priority over communication for the active wireless device 208 in response to selection of the requesting wireless device 206 via a user interface, e.g., by a user of the active wireless device 208 and/or the requesting wireless device 206 selecting to send audio data for the requesting wireless device 206 to the pair of wireless ear buds 202, 204. When there is no manual selection of the requesting wireless device 206, a determination of whether to send audio data from the requesting wireless device 206 or the active wireless device 208 to the pair of wireless ear buds 202, 204 can depend on a priority of the audio data of the requesting wireless device 206 relative to a priority of the audio data of the active wireless device 208. In some embodiments, only audio data having a priority level above a lowest "None" priority level can be considered for communication to the pair of wireless ear buds 202, 204. Thus, audio data having the lowest "None" priority level from the requesting wireless device 206 will not interrupt communication of audio data from the active wireless device 208, when the active wireless device 208 is communicating audio data to the pair of wireless ear buds, and will not be communicated to the pair of wireless ear buds 202, 204 when the active wireless device 208 is not communicating any audio data. Audio data having at least a priority level above the lowest "None" priority level, e.g., at a "Low" or higher priority level, can be communicated to the pair of wireless ear buds 202, 204 from the requesting wireless device 206 when the active wireless device 208 is not communicating any audio data. Audio data from the requesting wireless device 206 having at least a priority level equal or higher to audio data from the active wireless device 208 can be communicated to the pair of wireless ear buds 202, 204.

In an embodiment, a processor in one of the pair of wireless ear buds 202, 204 determines to accept an interrupt request from the requesting wireless device 206, pauses or mutes the active wireless device 208, and passes audio data from the requesting wireless device 206 through for audio reproduction by one or both of the pair of wireless ear buds 202, 204, when predetermined arbitration criteria are met. In another embodiment, a processor within the active wireless device 208 determines to accept a request from the requesting wireless device 206 and pass through audio data from the requesting wireless device 206 to one or both of the pair of wireless ear buds 202, 204 when the predetermined arbitration criteria are met. Various embodiments are possible in which a processor in a wireless device, such as in a wireless ear bud 202, 204, a requesting wireless device 206, an active wireless device 208, or another wirelessly connected wireless device can determine whether the predetermined arbitration criteria are met and allow audio data from the requesting wireless device 206 to pass through while muting or pausing audio data from the active wireless device 208 until the requesting wireless device 206 finishes passing through the audio data.

Figure 4:
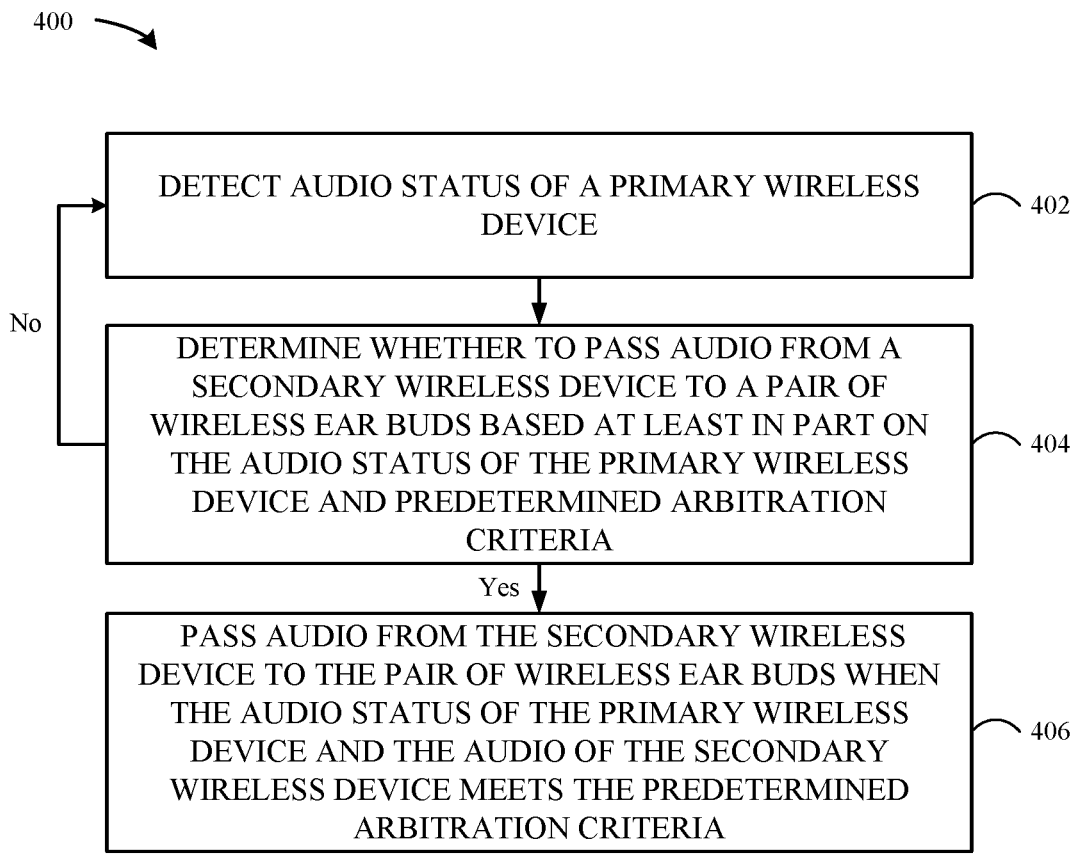
FIG. 4 illustrates an example method for determining whether to pass audio data from a requesting wireless device to either or both of a pair of wireless audio reproduction devices.

FIG. 4 illustrates a flow chart 400 of an example method for determining whether to pass audio data from a requesting wireless device 206 to one or more audio reproduction devices, e.g., to one or both of a pair of wireless ear buds 202, 204. At 402, a current audio status of an active wireless device 208 is detected. At 404, it is determined whether to pass audio data from a requesting wireless device 206 to either or both of a pair of wireless ear buds 202, 204, based at least in part on a current audio status of the active wireless device 208 and on predetermined arbitration criteria. When it is determined not to pass audio data from the requesting wireless device 206, the method proceeds back to 402. When it is determined to pass audio data from the requesting wireless device 206 to either one or both of the pair of wireless ear buds 202, 204, at 406, the audio data from the requesting wireless device 206 is passed through to either one or both of the pair of wireless ear buds 202, 204, when the current audio status of the active wireless device 208 and the audio data from the requesting wireless device 206 meet the predetermined arbitration criteria.

The example method of FIG. 4 can further include an aspect where detecting the current audio status of the active wireless device 208 includes detecting that the active wireless device 208 is operating in a music paused audio status, and where determining whether to pass the audio data from the requesting wireless device 206 to either one or both of the pair of wireless ear buds 202, 204, in response to the current audio status of the active wireless device 208 and the predetermined arbitration criteria includes determining to pass audio data of one or more types and/or from one or more sources (which, in some embodiments, includes any type or from any source) from the requesting wireless device 206 to either one or both of the wireless ear buds 202, 204. In some embodiments, this aspect can include determining to pass any alert, navigation, music, video, voicemail, alarm, voice call, or video call audio data from the requesting wireless device 206 to either one or both of the wireless ear buds 202, 204.

The example method of FIG. 4 can also include another aspect in which detecting the current audio status of the active wireless device 208 includes detecting that the active wireless device 208 is operating in a status in which audio data originates from one of the following sources: alert, navigation, game audio, music, video, voice recorder, voice mail, voice digital personal assistant, or alarm, and in which determining whether to pass the audio data from the requesting wireless device 206 to either one or both of the pair of wireless ear buds 202, 204 in response to the current audio status of the active wireless device 208 and the predetermined arbitration criteria includes determining not to pass audio data from any alert source or any navigation source and determining to pass audio data from any of the following sources: music, video, voicemail, alarm or voice call from the requesting wireless device 206 to either one or both of the wireless ear buds 202, 204.

The example method of FIG. 4 can include another aspect in which detecting the current audio status of the active wireless device 208 includes detecting that the active wireless device 208 is operating status in which audio data originates for a ringtone or a voice call, and in which determining whether to pass the audio data from the requesting wireless device 206 to either one or both of the pair of wireless ear buds 202 and 204 in response to the current audio status of the active wireless device 208 and the predetermined arbitration criteria includes determining not to pass any audio data from the requesting wireless device 206 to either one or both of the wireless ear buds 202, 204. This aspect can include a specific embodiment, in which the determining not to pass any audio data from the requesting wireless device 206 to either one or both of the wireless ear buds 202, 204 includes determining not to pass audio data for any of the following sources: alert, navigation, music, video, voice mail, digital personal assistant, alarm, or ringtone audio from the requesting wireless device 206 to either one or both of the wireless ear buds 202, 204.

Returning to FIG. 1, the active wireless device 108 and the requesting wireless device 106 are wirelessly connected to each other and both are connected to one or both of the pair of wireless ear buds 102, 104. Aspects of the present technology also include a simplified connection process between devices. For purposes of discussion of this embodiment, the active wireless device 108 can be referred to as a primary device and the requesting wireless device 106 can be referred to as a secondary device. Either device can be designated as a primary or a secondary device depending on their roles in a connection process. Rather than putting each device into a connection state and taking steps to pair each device shown in FIG. 1 with each other device (e.g., wireless ear buds 102, 104 with a primary device, wireless ear buds 102, 104 with a secondary device, and the primary device with the secondary device), it is possible to eliminate one or more active pairing steps utilizing a method as illustrated in FIG. 5 and described further herein.

Figure 5:
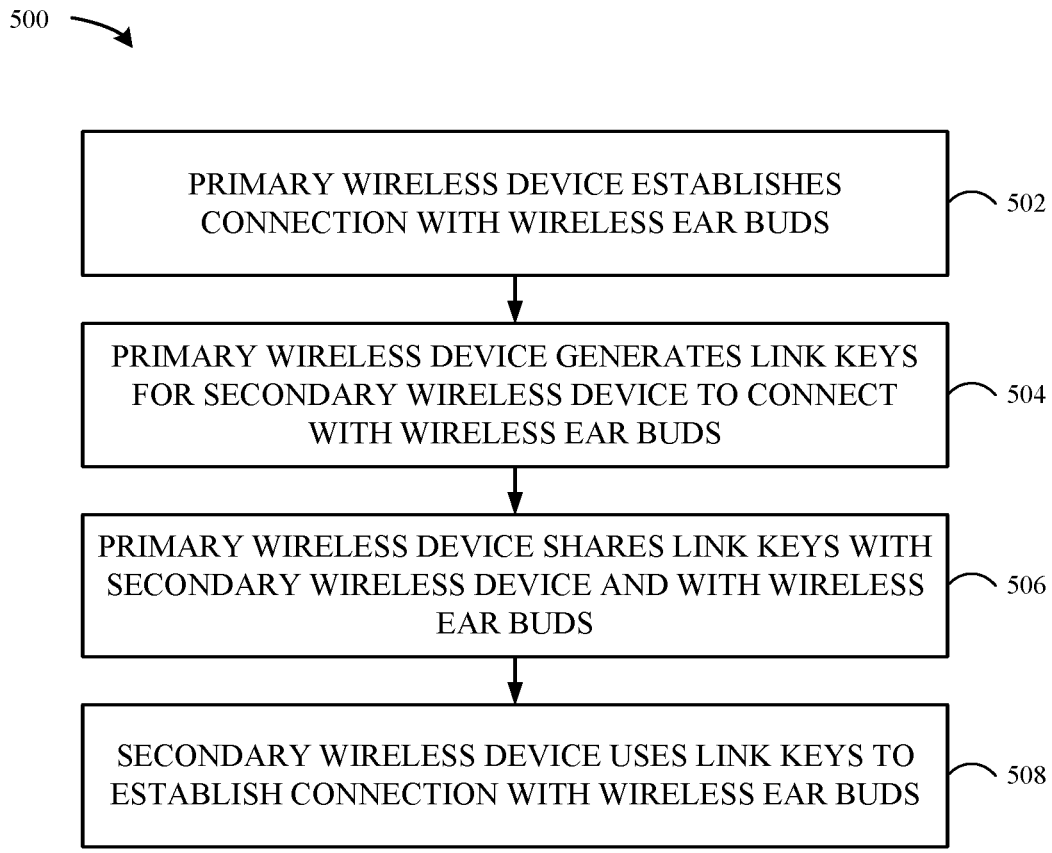
FIG. 5 illustrates an example method for establishing a connection between a secondary device and either or both of a pair of wireless audio reproduction devices.

FIG. 5 illustrates a flowchart 500 of an example method for establishing a connection between a secondary device and either one or both of a pair of wireless ear buds 102, 104. At 502, a connection is established between a primary device and either one or both of the pair of wireless ear buds 102, 104. In some embodiments, the established connection can be a Bluetooth connection that causes the primary device to be paired to either one or both of the pair of wireless ear buds 102, 104. In some embodiments, a user can be required to enter or to confirm settings in order to facilitate an initial pairing between the primary device and one or both of the pair of wireless ear buds 102, 104.

At 504, the primary device generates a set of link keys, parameters, and/or settings, etc. that can be used to facilitate seamless pairing between the secondary device and either one or both of the pair of wireless ear buds 102, 104. For example, the primary device can be a smartphone that has established a Bluetooth connection between itself and one or both of the wireless ear buds 102, 104. The secondary device can be a smart watch device that is configured to communicate with the primary device and is capable of also establishing a Bluetooth connection with one or both of the wireless ear buds 102, 104. Those that are skilled in the art will recognize that the primary device and the secondary device can include any type of wireless electronic device.

At step 506, the primary device can share the link keys, parameters, and/or settings, etc. with either one or both of the pair of wireless ear buds 102, 104 and also with the secondary device. At step 508, the secondary device can use the link keys, parameters, and/or settings, etc. to establish a connection with either one or both of the wireless ear buds 102, 104. In some embodiments, the connection is established automatically without intervention by a user of the secondary device. The secondary device can detect the presence of the wireless ear buds 102, 104 and utilize the parameters generated by the primary device to automatically pair with the wireless ear buds 102, 104. The secondary device can present an audible indication and/or a visual indication to the user to alert the user that a connection between the secondary device and one or both of the wireless ear buds 102, 104 has been successfully established. Those that are skilled in the art will recognize that the present technology is not limited to a primary device and a secondary device. In additional aspects of the present technology, the primary device can generate additional link keys or parameters that facilitate connections between secondary devices and any device/accessory that is currently paired or otherwise connected to the primary device.

In an embodiment, a method performed by an active wireless device 108 includes detecting an audio status of the active wireless device 108, the active wireless device 108 and a requesting wireless device 106 both being simultaneously communicatively coupled to one or both of a pair of wireless ear buds 102, 104. The method further includes the active wireless device 108 determining whether to transmit audio data from the requesting wireless device 106 to the one or both of the pair of wireless ear buds 102, 104 based at least in part on the audio status of the active wireless device 108 and predetermined arbitration criteria. Representative arbitration criteria include one or more rules for prioritizing between audio data associated with the active wireless device 108 and audio data associated with the requesting wireless device 106 based at least in part on priority levels for applications or operating system processes that generate audio data. Table 300, illustrated in FIG. 3A, and Table 350, illustrated in FIG. 3B, each summarize exemplary arbitration criteria and rules, in accordance with some embodiments. The method further includes the active wireless device 108 causing the audio data associated with the requesting wireless device 106 to be transmitted to one or both of the pair of wireless ear buds 102, 104 when the audio status of the active wireless device 108 and the audio data associated with the requesting wireless device 106 satisfy the predetermined arbitration criteria, where the audio status of the active wireless device 108 includes whether the active wireless device 108 is communicating audio data to one or both of the pair of wireless ear buds 102, 104.

In some embodiments, the audio status of the active wireless device 108 includes the active wireless device 108 operating in a muted state or an audio paused state in which audio data associated with the active wireless device 108 is not being communicated to the one or both of the pair of wireless ear buds 102, 104, in which case the audio data with the requesting wireless device 106 is transmitted to the one or both of the pair of wireless ear buds 102, 104. In some embodiments, the audio status of the active wireless device 108 includes the active wireless device 108 communicating audio data having a first priority level to the one or both of the pair of wireless ear buds 102, 104, and the audio data associated with the requesting wireless device 106 includes audio data having a second priority level that is equal to or higher than the first priority level, in which case the audio data of the second priority level associated with the requesting wireless device 106 is transmitted to the one or both of the pair of wireless ear buds 102, 104, and transmission of the audio data of the first priority level associated with the active wireless device 108 is suspended. In some embodiments, the audio data having the second priority level associated with the requesting wireless device 106 includes audio data associated with a voice call or a video call. In some embodiments, the audio status of the active wireless device 108 includes the active wireless device 108 communicating audio data having a first priority level to the one or both of the pair of wireless ear buds 102, 104, and the audio data associated with the requesting wireless device 106 includes audio data having a second priority level lower than the first priority level, in which case, the audio data of the second priority level associated with the requesting wireless device is not transmitted to the one or both of the pair of wireless ear buds 102, 104. In some embodiments, the audio data having the first priority level associated with the active wireless device 108 includes audio data associated with a voice call or a video call, and the audio data having the second priority level associated with the requesting wireless device 106 includes audio data associated with an application or operating system process other than servicing a voice call or a video call. In some embodiments, the audio data having the second priority level associated with the requesting wireless device 106 includes audio data corresponding to at least one of an alert, an alarm, a navigation application, a game application, media playback, or a voice mail. In some embodiments, the method further includes the active wireless device 108 detecting a wearing status of the one or both of the pair of wireless ear buds 102, 104, and audio data is transmitted to the one or both of the pair of wireless ear buds 102, 104 from either the active wireless device 108 or the requesting wireless device 106 when at least one wireless ear bud 102, 104 has an in-ear status. In some embodiments, audio data is not transmitted to the one or both of the pair of wireless ear buds 102, 104 from either the active wireless device 108 or the requesting wireless device 106 when both of the pair of wireless ear buds 102, 104 have an out-of-ear status.

In an embodiment, a non-transitory computer-readable medium stores processor-executable instructions that, when executed by one or more processors, cause an active wireless device 108 to: (i) detect an audio status of the active wireless device 108 communicatively coupled to at least one wireless ear bud of a pair of wireless ear buds 102, 104; (ii) receive a request to transmit data to the at least one wireless ear bud from a requesting wireless device 106, the requesting wireless device 106 and the active wireless device 108 both being simultaneously communicatively coupled to the at least one wireless ear bud of the pair of wireless ear buds 102, 104, the active wireless device 108 having control of an audio channel for transmission of audio data to the at least one wireless ear bud of the pair of wireless ear buds 102, 104; (iii) determine whether to grant the request to transmit the audio data associated with the requesting wireless device 106 to the at least one wireless ear bud based at least in part on the audio status of the active wireless device 108 and predetermined arbitration criteria; and (iv) grant the request to transmit the audio data associated with the requesting wireless device 106 to the at least one wireless ear bud when the audio status of the active wireless device 108 and the audio data associated with the requesting wireless device 106 satisfy the predetermined arbitration criteria.

In some embodiments, the audio status of the active wireless device 108 includes the active wireless device 108 operating in a muted state or an audio paused state in which audio data associated with the active wireless device 108 is not being communicated to the at least one wireless ear bud of the pair of wireless ear buds 102, 104, in which case the request to transmit the audio data associated with the requesting wireless device 106 to the at least one wireless ear bud of the pair of wireless ear buds 102, 104 is granted. In some embodiments, the audio status of the active wireless device 108 includes the active wireless device 108 communicating audio data having a first priority level to the at least one wireless ear bud of the pair of wireless ear buds 102, 104; and the audio data associated with the requesting wireless device 106 includes audio data having a second priority level that is equal to or higher than the first priority level, in which case the request to transmit the audio data of the second priority level associated with the requesting wireless device 106 to the at least one of the pair of wireless ear buds 102, 104 is granted, and transmission of the audio data of the first priority level associated with the active wireless device 108 is suspended. In some embodiments, the audio status of the active wireless device 108 includes the active wireless device 108 communicating audio data having a first priority level to the at least one wireless ear bud of the pair of wireless ear buds 102, 104; and the audio data associated with the requesting wireless device 106 includes audio data having a second priority level lower than the first priority level, in which case the request to transmit the audio data of the second priority level associated with the requesting wireless device 106 to the at least one of the pair of wireless ear buds 102, 104 is not granted. In some embodiments, the active wireless device 108 detects a wearing status of the at least one wireless ear bud of the pair of wireless ear buds 102, 104, and audio data is transmitted to the at least one wireless ear bud of the pair of wireless ear buds 102, 104 from either the active wireless device 108 or the requesting wireless device 106 when at least one wireless ear bud has an in-ear status. In some embodiments, audio data is not transmitted to the at least one wireless ear bud of the pair of wireless ear buds 102, 104 from either the active wireless device 108 or the requesting wireless device 106 when both of the pair of wireless ear buds has an out-of-ear status.

In an embodiment, an apparatus of an active wireless device 108 includes: (i) means for detecting an audio status of the active wireless device 108 communicatively coupled to at least one wireless ear bud of a pair of wireless ear buds 102, 104; (ii) means for receiving a request to transmit data to the at least one wireless ear bud from a requesting wireless device 106, the requesting wireless device 106 and the active wireless device 108 both being simultaneously communicatively coupled to the at least one wireless ear bud of the pair of wireless ear buds 102, 104, the active wireless device 108 having control of an audio channel for transmission of audio data to the at least one wireless ear bud of the pair of wireless ear buds 102, 104; (iii) means for determining whether to grant the request to transmit the audio data associated with the requesting wireless device 106 to the at least one wireless ear bud based at least in part on the audio status of the active wireless device 108 and predetermined arbitration criteria; and (iv) means for granting the request to transmit the audio data associated with the requesting wireless device 106 to the at least one wireless ear bud when the audio status of the active wireless device 108 and the audio data associated with the requesting wireless device 106 satisfy the predetermined arbitration criteria.

In some embodiments, the audio status of the active wireless device 108 includes the active wireless device 108 operating in a muted state or an audio paused state in which audio data associated with the active wireless device 108 is not being communicated to the at least one wireless ear bud of the pair of wireless ear buds 102, 104, in which case the request to transmit the audio data associated with the requesting wireless device 106 to the at least one wireless ear bud of the pair of wireless ear buds 102, 104 is granted. In some embodiments, the audio status of the active wireless device 108 includes the active wireless device 108 communicating audio data having a first priority level to the at least one wireless ear bud of the pair of wireless ear buds 102, 104; and the audio data associated with the requesting wireless device 106 includes audio data having a second priority level that is equal to or higher than the first priority level, in which case the request to transmit the audio data of the second priority level associated with the requesting wireless device 106 to the at least one of the pair of wireless ear buds 102, 104 is granted, and transmission of the audio data of the first priority level associated with the active wireless device 108 is suspended. In some embodiments, the audio status of the active wireless device 108 includes the active wireless device 108 communicating audio data having a first priority level to the at least one wireless ear bud of the pair of wireless ear buds 102, 104; and the audio data associated with the requesting wireless device 106 includes audio data having a second priority level lower than the first priority level, in which case the request to transmit the audio data of the second priority level associated with the requesting wireless device 106 to the at least one of the pair of wireless ear buds 102, 104 is not granted. In some embodiments, the apparatus of the active wireless device 108 further includes means for detecting a wearing status of the at least one wireless ear bud of the pair of wireless ear buds 102, 104, and audio data is transmitted to the at least one wireless ear bud of the pair of wireless ear buds 102, 104 from either the active wireless device 108 or the requesting wireless device 106 when at least one wireless ear bud has an in-ear status. In some embodiments, audio data is not transmitted to the at least one wireless ear bud of the pair of wireless ear buds 102, 104 from either the active wireless device 108 or the requesting wireless device 106 when both of the pair of wireless ear buds has an out-of-ear status.

In an embodiment, a wireless device, e.g., an active wireless device 108, includes at least a processor, and a non-transitory computer-readable storage medium storing processor-executable instructions that, when executed by the processor, cause the wireless device to: (i) detect an audio status of the wireless device; (ii) determine whether to allow a second wireless device, e.g., a requesting wireless device 106, to transmit audio data associated with the second wireless device to one or more wireless audio reproduction devices based at least in part on the audio status of the wireless device and predetermined arbitration criteria; and (iii) allow the second wireless device to transmit the audio data associated with the requesting wireless device to the one or more wireless audio reproduction devices when the audio status of the wireless device and the audio data associated with the second wireless device satisfy the predetermined arbitration criteria, where the second wireless device and the wireless device are both simultaneously communicatively coupled to the one or more wireless audio reproduction devices, the wireless device having control of an audio channel for transmission of audio data to the one or more wireless audio reproduction devices.

In some embodiments, the audio status of the wireless device includes the wireless device operating in a muted state or an audio paused state in which audio data from the wireless device is not being communicated to the one or more wireless audio reproduction devices, in which case the audio data associated with the second wireless device is transmitted to the one or more wireless audio reproduction devices. In some embodiments, the audio status of the wireless device includes the wireless device communicating audio data having a first priority level to the one or more wireless audio reproduction devices, and the audio data associated with the second wireless device includes audio data having a second priority level that is equal to or higher than the first priority level, in which case the audio data of the second priority level associated with the second wireless device is transmitted to the one or more wireless audio reproduction devices, and transmission of the audio data of the first priority level associated with the wireless device is suspended. In some embodiments, the audio status of the wireless device includes the wireless device communicating audio data having a first priority level to the one or more wireless audio reproduction devices, and the audio data associated with the second wireless device includes audio data having a second priority level lower than the first priority level, in which case the audio data of the second priority level associated with the second wireless device is not transmitted to the one or more wireless audio reproduction devices. In some embodiments, the predetermined arbitration criteria include one or more rules for prioritizing between audio data associated with the wireless device and audio data associated with the second wireless device based at least in part on priority levels for applications or operating system processes that generate the audio data.

Figure 6A:
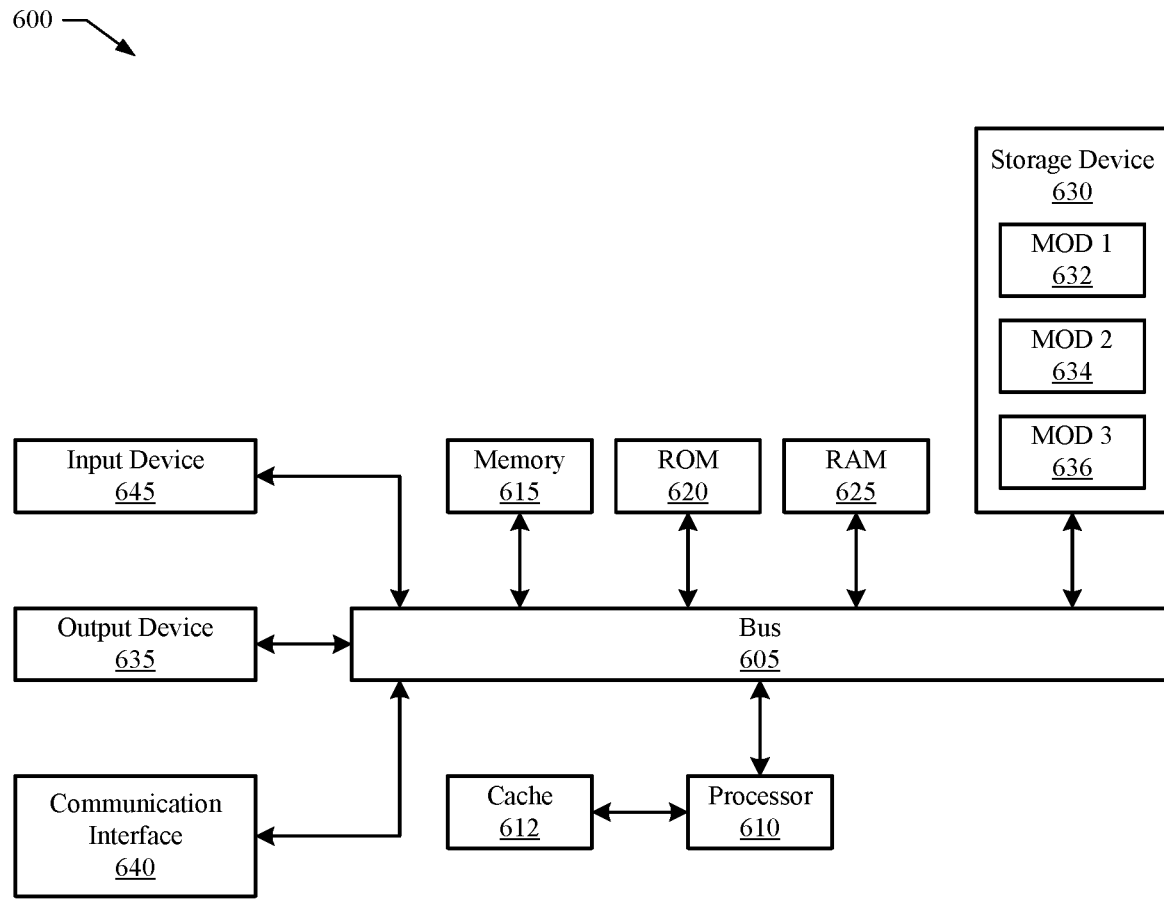
FIG. 6A illustrates an example system bus computing system architecture for executing the disclosed technology.
Figure 6B:
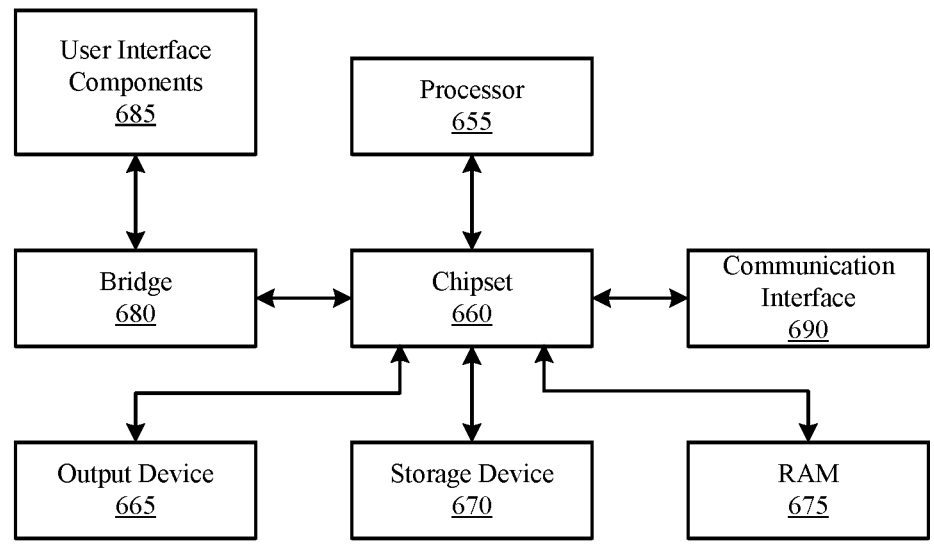
FIG. 6B illustrates an example computer system having a representative chipset architecture for executing the disclosed technology.

FIGS. 6A and 6B illustrate exemplary system embodiments. FIG. 6A illustrates an exemplary system 600 with a conventional system bus computing system architecture in which components of the exemplary system 600 are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610.

The system 600 can include a cache 612 of high-speed memory connected directly with, in close proximity to, or integrated as part of the processor 610. The system 600 can copy data from the memory 615 and/or the storage device 630 to the cache 612 for quick access by the processor 610. In this way, the cache 612 can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the system 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the system 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described methods and can include generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output device 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated, e.g., by a user of system 650.

Chipset 660 can also interface with one or more communication interfaces 690 that can have different physical interfaces. Such communication interfaces 690 can include interfaces for wired networks, wireless local area networks, broadband wireless networks, as well as wireless personal area networks. Some applications of the methods disclosed herein can include receiving ordered datasets over the physical interface or be generated by the machine itself by processor 655 and analyzing data stored in storage 670 or 675. Further, the machine can receive inputs from a user via user interface components 685 and execute appropriate functions, such as browsing functions by interpreting these inputs using processor 655.

It can be appreciated that exemplary systems 600 and 650 can have more than one processor or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable (processor-executable) instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, Universal Serial Bus (USB) devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
by a wireless ear bud:
receiving audio data from an active wireless device via a wireless communication protocol;
receiving an interrupt request from a requesting wireless device via the wireless communication protocol;
determining whether to authorize the interrupt request and reproduce audio data associated with the requesting wireless device based at least in part on i)

one or more predetermined arbitration criteria and ii) an audio status of the active wireless device, the audio status of the active wireless device comprising whether the active wireless device is communicating audio data or is operating in a muted state or an audio paused state in which audio data is not being communicated to the wireless ear bud; and authorizing the interrupt request and reproducing the audio data associated with the requesting wireless device when the audio status of the active wireless device and the one or more predetermined arbitration criteria are satisfied, wherein:

the one or more predetermined arbitration criteria are satisfied when the audio status of the active wireless device comprises the active wireless device operating in the muted state or the audio paused state;

the one or more predetermined arbitration criteria are not satisfied:

when the audio status of the active wireless device comprises the active wireless device sending a ringtone; and when the audio data from the active wireless device comprises a voice call or a video call; and the wireless ear bud receives the audio data associated with the requesting wireless device via a connection established using link keys generated by the active wireless device and provided to both the wireless ear bud and the requesting wireless device by the active wireless device.

2. The method of claim 1, further comprising:
determining not to reproduce the audio data from the requesting wireless device when the interrupt request is not authorized.

3. The method of claim 1, wherein:
the one or more predetermined arbitration criteria are satisfied when:
the audio data from the active wireless device does not comprise any of: a ringtone, a voice call, or a video call; and
the audio data from the requesting wireless device is neither an alert nor navigation audio.

4. The method of claim 1, wherein when:
i) the audio status of the active wireless device comprises the active wireless device communicating audio data having a first priority level to the wireless ear bud, and
ii) the audio data associated with the requesting wireless device comprises audio data having a second priority level that is equal to or higher than the first priority level:
the wireless ear bud reproduces the audio data of the second priority level associated with the requesting wireless device, and
transmission of the audio data of the first priority level associated with the active wireless device is suspended.

5. The method of claim 1, wherein when:
i) the audio status of the active wireless device comprises the active wireless device communicating audio data having a first priority level to the wireless ear bud, and
ii) the audio data associated with the requesting wireless device comprises audio data having a second priority level lower than the first priority level:
the audio data of the second priority level associated with the requesting wireless device is not reproduced via the wireless ear bud.

6. The method of claim 1, wherein:
the interrupt request indicates that the requesting wireless device seeks to send data to the wireless ear bud and identifies a type of the data; and
the method further comprises determining whether to prioritize the data from the requesting wireless device over the data from the active wireless device based at least in part on the one or more predetermined arbitration criteria, the audio status of the active wireless device, and the type of the data identified by the interrupt request.

7. The method of claim 1, further comprising, by the wireless ear bud:
determining one or more operating parameters for communication with the active wireless device and/or the requesting wireless device, and
providing the one or more operating parameters to a second wireless ear bud that is monitoring communication between the wireless ear bud and the active wireless device and/or the requesting wireless device.

8. The method of claim 7, further comprising:
operating the wireless ear bud as a primary wireless ear bud, wherein the second wireless ear bud operates as a secondary wireless ear bud; and
switching the wireless ear bud to operate as the secondary wireless ear bud based at least on criteria of the wireless ear bud and/or the second wireless ear bud, the criteria comprising wearing status of the wireless ear bud and of the second wireless ear bud.

9. The method of claim 1, further comprising:
operating the wireless ear bud as a bridge to route communications between the active wireless device and the requesting wireless device when a link between the active wireless device and the requesting wireless device fails.

10. An apparatus configurable for operating in a wireless ear bud, the apparatus comprising:
a processor; and
a memory storing processor-executable instructions that, when executed by the processor, cause the wireless ear bud to:
receive audio data from an active wireless device via a wireless communication protocol;
receive an interrupt request from a requesting wireless device via the wireless communication protocol;
determine whether to authorize the interrupt request and reproduce audio data associated with the requesting wireless device based at least in part on i) one or more predetermined arbitration criteria and ii) an audio status of the active wireless device, the audio status of the active wireless device comprising whether the active wireless device is communicating audio data or is operating in a muted state or an audio paused state in which audio data is not being communicated to the wireless ear bud; and
authorize the interrupt request and reproduce the audio data associated with the requesting wireless device when the audio status of the active wireless device and the one or more predetermined arbitration criteria are satisfied, wherein:

the one or more predetermined arbitration criteria are satisfied when the audio status of the active wireless device comprises the active wireless device operating in the muted state or the audio paused state;

the one or more predetermined arbitration criteria are not satisfied:
when the audio status of the active wireless device comprises the active wireless device sending a ringtone; and
when the audio data from the active wireless device comprises a voice call or a video call; and
the wireless ear bud receives the audio data associated with the requesting wireless device via a connection established using link keys generated by the active wireless device and provided to both the wireless ear bud and the requesting wireless device by the active wireless device.

11. The apparatus of claim 10, wherein execution of the instructions further causes the wireless ear bud to:
determine not to reproduce audio data from the requesting wireless device when the interrupt request is not authorized.

12. The apparatus of claim 10, wherein the one or more predetermined arbitration criteria are satisfied when:
the audio data from the active wireless device does not comprise any of: a ringtone, a voice call, or a video call; and
the audio data from the requesting wireless device is neither an alert nor navigation audio.

13. The apparatus of claim 10, wherein when:
(i) the audio status of the active wireless device comprises the active wireless device communicating audio data having a first priority level to the wireless ear bud, and
(ii) the audio data associated with the requesting wireless device comprises audio data having a second priority level that is equal to or higher than the first priority level:
the wireless ear bud reproduces the audio data of the second priority level associated with the requesting wireless device, and
transmission of the audio data of the first priority level associated with the active wireless device is suspended.

14. The apparatus of claim 10, wherein when:
i) the audio status of the active wireless device comprises the active wireless device communicating audio data having a first priority level to the wireless ear bud, and
ii) the audio data associated with the requesting wireless device comprises audio data having a second priority level lower than the first priority level:
the audio data of the second priority level associated with the requesting wireless device is not reproduced via the wireless ear bud.

15. The apparatus of claim 10, wherein:
the interrupt request indicates that the requesting wireless device seeks to send data to the wireless ear bud and identifies a type of the data; and
execution of the instructions further causes the wireless ear bud to determine whether to prioritize the data from the requesting wireless device over the data from the active wireless device based at least in part on the one or more predetermined arbitration criteria, the audio status of the active wireless device, and the type of the data identified by the interrupt request.

16. The apparatus of claim 10, wherein execution of the instructions further causes the wireless ear bud to:

determine one or more operating parameters for communication with the active wireless device and/or the requesting wireless device, and
provide the one or more operating parameters to a second wireless ear bud that is monitoring communication between the wireless ear bud and the active wireless device and/or the requesting wireless device.

17. The apparatus of claim 16, wherein execution of the instructions further causes the wireless ear bud to:
operate as a primary wireless ear bud, wherein the second wireless ear bud operates as a secondary wireless ear bud; and
switch the wireless ear bud to operate as the secondary wireless ear bud based at least on criteria of the wireless ear bud and/or the second wireless ear bud, the criteria comprising a wearing status of the wireless ear bud and of the second wireless ear bud.

18. The apparatus of claim 10, wherein execution of the instructions further causes the wireless ear bud to:
operate as a bridge to route communications between the active wireless device and the requesting wireless device when a link between the active wireless device and the requesting wireless device fails.

19. A wireless ear bud comprising:
an antenna for wireless communication;
a speaker for reproducing audio data;
a processor; and
a memory storing instructions that, when executed by the processor cause the wireless ear bud to:
receive audio data from an active wireless device via a wireless communication protocol;
receive an interrupt request from a requesting wireless device via the wireless communication protocol;
determine whether to authorize the interrupt request and reproduce audio data associated with the requesting wireless device based at least in part on i) one or more predetermined arbitration criteria and ii) an audio status of the active wireless device, the audio status of the active wireless device comprising whether the active wireless device is communicating audio data or is operating in a muted state or an audio paused state in which audio data is not being communicated to the wireless ear bud; and
authorize the interrupt request and reproduce the audio data associated with the requesting wireless device when the audio status of the active wireless device and the one or more predetermined arbitration criteria are satisfied,
wherein:
the one or more predetermined arbitration criteria are satisfied when the audio status of the active wireless device comprises the active wireless device operating in the muted state or the audio paused state;
the one or more predetermined arbitration criteria are not satisfied:
when the audio status of the active wireless device comprises the active wireless device sending a ringtone; and
when the audio data from the active wireless device comprises a voice call or a video call; and
the wireless ear bud receives the audio data associated with the requesting wireless device via a connection established using link keys generated by the active wireless device and provided to both the wireless ear bud and the requesting wireless device by the active wireless device.

20. The wireless ear bud of claim 19, wherein execution of the instructions further causes the wireless ear bud to:
   determine one or more operating parameters for communication with the active wireless device and/or the requesting wireless device, and
   provide the one or more operating parameters to a second wireless ear bud that is monitoring communication between the wireless ear bud and the active wireless device and/or the requesting wireless device.

\* \* \* \* \*